US012576731B2

(12) United States Patent
    Shinagawa et al.

(10) Patent No.: US 12,576,731 B2
(45) Date of Patent: Mar. 17, 2026

---

(54) FUEL CELL ELECTRIC VEHICLE

(71) Applicant: TOYOTA JIDOSHA KABUSHIKI KAISHA, Aichi-ken (JP)

(72) Inventors: Tomohiro Shinagawa, Toyota (JP); Yuchi Yamanouchi, Toyota (JP); Takuro Mizushima, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 338 days.

(21) Appl. No.: 18/544,442

(22) Filed: Dec. 19, 2023

(65) Prior Publication Data

US 2024/0208339 A1    Jun. 27, 2024

(30) Foreign Application Priority Data

Dec. 26, 2022    (JP) ................................. 2022-208114

(51) Int. Cl.
    | | |
    |---|---|
    | *B60L 50/75* | (2019.01) |
    | *B60K 1/04* | (2019.01) |
    | *B60K 15/063* | (2006.01) |
    | *B60L 1/00* | (2006.01) |
    | *B60K 15/03* | (2006.01) |
    | *H01M 8/22* | (2006.01) |

(52) U.S. Cl.
    CPC ................ *B60L 50/75* (2019.02); *B60K 1/04* (2013.01); *B60K 15/063* (2013.01); *B60L 1/00* (2013.01); *B60K 2015/03315* (2013.01); *B60K 2015/0634* (2013.01); *H01M 8/22* (2013.01); *H01M 2250/20* (2013.01)

(58) Field of Classification Search
    CPC .............................. B60L 50/75; B60K 15/063
    See application file for complete search history.

(56) References Cited

U.S. PATENT DOCUMENTS

| | | | | |
|---|---|---|---|---|
| 5,673,939 A | * | 10/1997 | Bees | ........................ B60K 1/04 |
| | | | | 280/834 |
| 6,953,099 B2 | * | 10/2005 | Kawasaki | ............... B60L 50/71 |
| | | | | 280/834 |
| 7,219,758 B2 | * | 5/2007 | Guidry | ................. B60K 15/067 |
| | | | | 180/65.1 |
| 7,303,211 B2 | * | 12/2007 | Borroni-Bird | ........... B60K 1/04 |
| | | | | 280/783 |
| 7,533,748 B2 | * | 5/2009 | Miyajima | ............. H01M 8/247 |
| | | | | 903/952 |

(Continued)

FOREIGN PATENT DOCUMENTS

| | | |
|---|---|---|
| JP | 2006182044 A | 7/2006 |
| JP | 2019-079656 A | 5/2019 |

(Continued)

*Primary Examiner* — Erez Gurari
(74) *Attorney, Agent, or Firm* — HAUPTMAN HAM, LLP

(57) ABSTRACT

A fuel cell electric vehicle comprises a fuel cell; a pair of side rails extending in a front-and-rear direction of the vehicle under a floor of the vehicle; a plurality of hydrogen tanks disposed under the floor of the vehicle, at a rear side of a front wheel, and at a front side of a rear wheel; and a main battery for storing electric power generated by the fuel cell, wherein the plurality of hydrogen tanks include two or more hydrogen tanks arranged in parallel in a vehicle width direction between the pair of side rails, and the main battery is disposed on the floor of the vehicle at a rear portion of the vehicle.

5 Claims, 5 Drawing Sheets

(56) References Cited

U.S. PATENT DOCUMENTS

| | | | | |
|---|---|---|---|---|
| 7,770,679 | B2 * | 8/2010 | Takaku | B60L 50/71 |
| | | | | 180/68.5 |
| 8,056,928 | B2 * | 11/2011 | Ijaz | B60K 15/013 |
| | | | | 280/830 |
| 8,960,360 | B2 * | 2/2015 | Sangha | B62D 21/17 |
| | | | | 180/309 |
| 10,926,628 | B2 * | 2/2021 | Otsura | B60K 15/03006 |
| 2004/0040755 | A1 * | 3/2004 | Swindell | B60L 58/40 |
| | | | | 180/2.2 |
| 2005/0161267 | A1 * | 7/2005 | Elson | B62D 21/16 |
| | | | | 180/69.5 |
| 2006/0032532 | A1 * | 2/2006 | Suess | F17C 13/083 |
| | | | | 137/266 |
| 2006/0033322 | A1 * | 2/2006 | Suess | B60K 15/07 |
| | | | | 280/830 |
| 2006/0061081 | A1 | 3/2006 | Kresse, Jr. et al. | |
| 2008/0142289 | A1 * | 6/2008 | Yang | B60K 1/04 |
| | | | | 180/312 |
| 2009/0090575 | A1 | 4/2009 | Nagasaka | |
| 2013/0078496 | A1 * | 3/2013 | Lim | H01M 10/6563 |
| | | | | 429/120 |
| 2013/0094842 | A1 * | 4/2013 | Ohtsuka | H01M 8/04014 |
| | | | | 137/561 A |
| 2014/0367182 | A1 * | 12/2014 | Yoshinaga | H01M 8/2475 |
| | | | | 180/68.4 |
| 2019/0263450 | A1 * | 8/2019 | Inoue | B62D 21/152 |
| 2020/0108874 | A1 * | 4/2020 | Koike | B62D 21/155 |
| 2022/0402354 | A1 * | 12/2022 | Wang | H01M 50/249 |
| 2023/0016788 | A1 * | 1/2023 | Choi | B62D 25/20 |
| 2023/0173914 | A1 * | 6/2023 | Choi | B60K 15/03006 |
| 2024/0105973 | A1 * | 3/2024 | Hirawaki | B60L 50/75 |
| 2024/0208339 | A1 * | 6/2024 | Shinagawa | B60L 50/72 |
| 2024/0367506 | A1 * | 11/2024 | Andreas | B60K 15/063 |
| 2025/0303839 | A1 * | 10/2025 | Park | H01M 8/04201 |
| 2025/0313101 | A1 * | 10/2025 | Louis | B60L 58/40 |

FOREIGN PATENT DOCUMENTS

| | | | |
|---|---|---|---|
| JP | | 2019147500 A | 9/2019 |
| JP | | 2022-073238 A | 5/2022 |

* cited by examiner

FUEL CELL ELECTRIC VEHICLE

CROSS REFERENCE TO RELATED APPLICATION

This application claims priority to Japanese Patent Application No. 2022-208114 filed on Dec. 26, 2022, which is incorporated herein by reference in its entirety including the specification, claims, drawings, and abstract.

TECHNICAL FIELD

This specification discloses a fuel cell electric vehicle equipped with a fuel cell.

BACKGROUND

Conventionally, fuel cell electric vehicles equipped with a fuel cell have been widely known. A fuel cell is a device that generates power by chemically reacting hydrogen and oxygen. Therefore, a hydrogen tank for storing hydrogen is mounted on the fuel cell electric vehicle.

When the hydrogen tank is arranged on the floor of the vehicle, the cabin becomes narrower. There is also known a technique of disposing a hydrogen tank under a floor of a vehicle. For example, Patent Document 1 discloses a fuel cell electric vehicle in which a hydrogen tank is disposed under a floor of the vehicle. According to this technology, it is possible to secure a wider cabin than when the hydrogen tank is disposed on the floor.

However, in the case of the vehicle described in Patent Document 1, the hydrogen tank is disposed only outside the side rail in the vehicle width direction. The side rail is a skeleton member extending in the longitudinal direction of the vehicle in the vicinity of an end portion of the vehicle in the vehicle width direction. A wheel is also disposed outside the side rail in the vehicle width direction. Therefore, in the case of the vehicle according to Patent Document 1, the hydrogen tank needs to be arranged so as to avoid the wheels. In the case of the vehicle described in Patent Document 1, the number of hydrogen tanks needs to be reduced or the size of the hydrogen tank needs to be reduced. As a result, in the case of the vehicle described in Patent Document 1, the hydrogen capacity that can be stored in the vehicle may be reduced.

Accordingly, the present specification discloses a fuel cell electric vehicle capable of storing a larger amount of hydrogen while ensuring a wide cabin.

CITATION LIST

Patent Document 1: JP 2022-073238 A

SUMMARY

A fuel cell electric vehicle disclosed herein comprises a fuel cell; a pair of side rails extending in a front-and-rear direction of the vehicle under a floor of the vehicle; a plurality of hydrogen tanks disposed under the floor of the vehicle, at a rear side of a front wheel, and at a front side of a rear wheel; and a main battery for storing electric power generated by the fuel cell, wherein the plurality of hydrogen tanks include two or more hydrogen tanks arranged in parallel in a vehicle width direction between the pair of side rails, and the main battery is disposed on the floor of the vehicle at a rear portion of the vehicle.

By disposing a plurality of hydrogen tanks under the floor of the vehicle, a wide vehicle compartment can be ensured. Further, by disposing some hydrogen tanks between the pair of side rails, a larger amount of hydrogen can be stored.

In this case, the fuel cell electric vehicle further may comprise an external power supply unit that includes an inverter and supplies the electric power of the main battery to an external device; and an exhaust pipe that guides exhaust air, which is cooling air after cooling the external power supply unit, to the outside, wherein the external power supply unit may be disposed adjacent to a front side of the main battery on the floor of the vehicle, the exhaust pipe may include an exhaust port for exhausting an exhaust gas, and the exhaust port may face outward in the vehicle width direction above the floor of the vehicle.

With such a configuration, even if hydrogen leaks from the hydrogen tank to the space under the floor, the hydrogen hardly flows into the exhaust port. As a result, the inflow of hydrogen into the cabin is effectively prevented.

The fuel cell electric vehicle may further comprises: a drive unit that includes a rotary electric machine and rotationally drives wheels, wherein the plurality of hydrogen tanks may include two inner hydrogen tanks and two outer hydrogen tanks, the two inner hydrogen tanks may be arranged in parallel in the vehicle width direction between the pair of side rails, the two outer hydrogen tanks may be disposed so as to sandwich the pair of side rails and the two inner hydrogen tanks in the vehicle width direction, the drive unit may be disposed between the pair of side rails and rearward of the two inner hydrogen tanks, and the two outer hydrogen tanks mat be arranged offset rearward of the vehicle relative to the two inner hydrogen tanks.

By disposing the outer hydrogen tank at a position offset to the rear of the vehicle from the inner hydrogen tank, a large space can be secured in front of the outer hydrogen tank. Further, by disposing the driving unit in the above-described arrangement, interference between the driving unit and the hydrogen tank is prevented.

The fuel cell electric vehicle may further comprising: an entrance opening formed in a side surface of the vehicle; an entrance step disposed adjacent to an inner side of the entrance opening in a vehicle width direction below a floor surface; and an auxiliary battery, wherein the rear wheel may be a drive wheel, the drive unit may be disposed between left and right rear wheels, each of the two outer hydrogen tanks may be disposed adjacent to a front side of the rear wheel, the auxiliary battery may be disposed adjacent to a front side of one of the two outer hydrogen tanks, the entrance step may be disposed adjacent a front side of the auxiliary battery.

With this configuration, the operator can easily access the auxiliary battery from the side of the entrance step. Further, since the drive unit is disposed between the pair of drive wheels, the propeller shaft becomes unnecessary, and the space efficiency under the floor is improved.

The fuel cell may be disposed closer to a front of the vehicle than the plurality of hydrogen tanks.

In such a configuration, the fuel cell is disposed in the front portion of the vehicle, the hydrogen tank is disposed in the center of the vehicle, and the drive unit is disposed in the rear portion of the vehicle. This arrangement stabilizes the weight balance of the vehicle as a whole.

According to the fuel cell electric vehicle disclosed in this specification, it is possible to store a larger amount of hydrogen while ensuring a wide cabin.

BRIEF DESCRIPTION OF DRAWINGS

Embodiment(s) of the present disclosure will be described based on the following figures, wherein:

3

Figure 1:
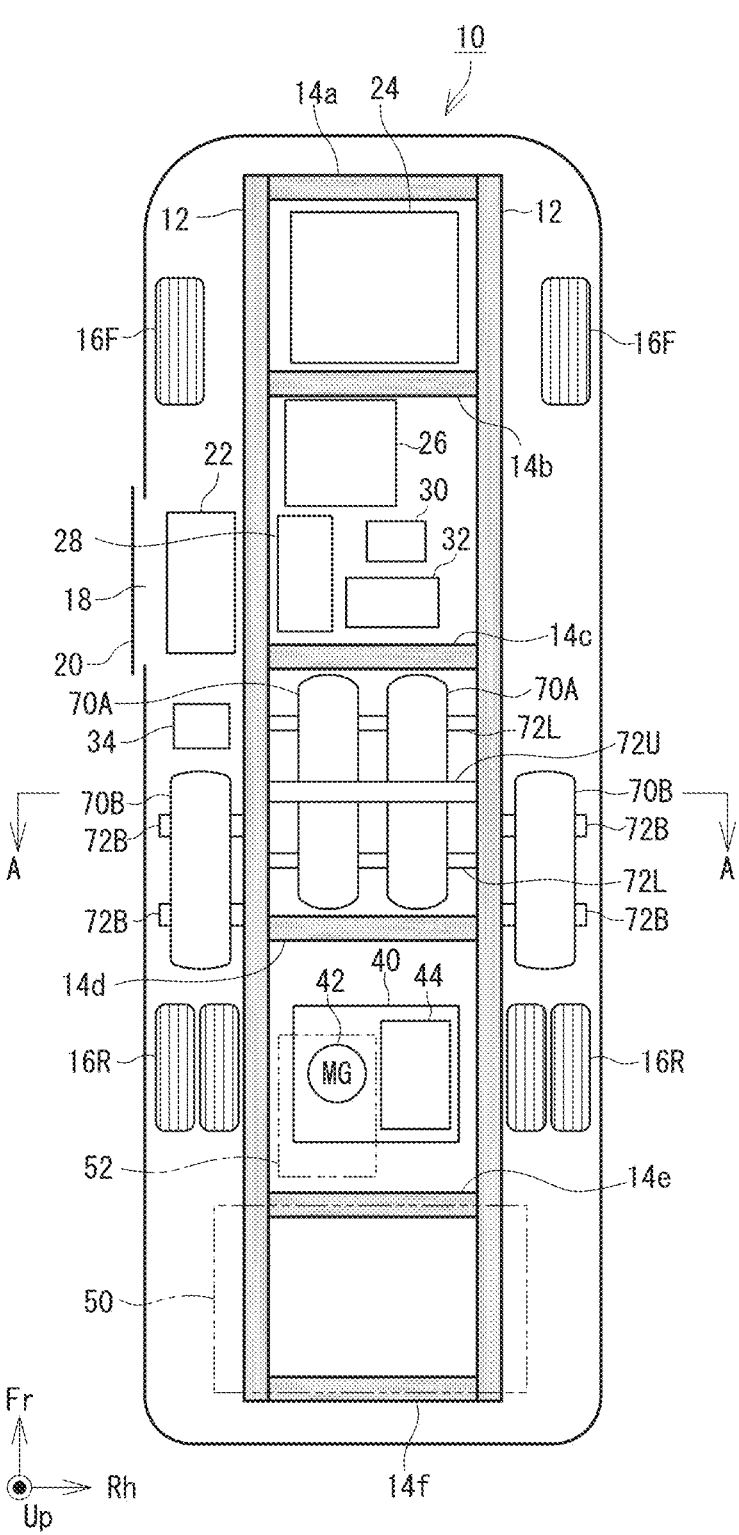
Figure 2:
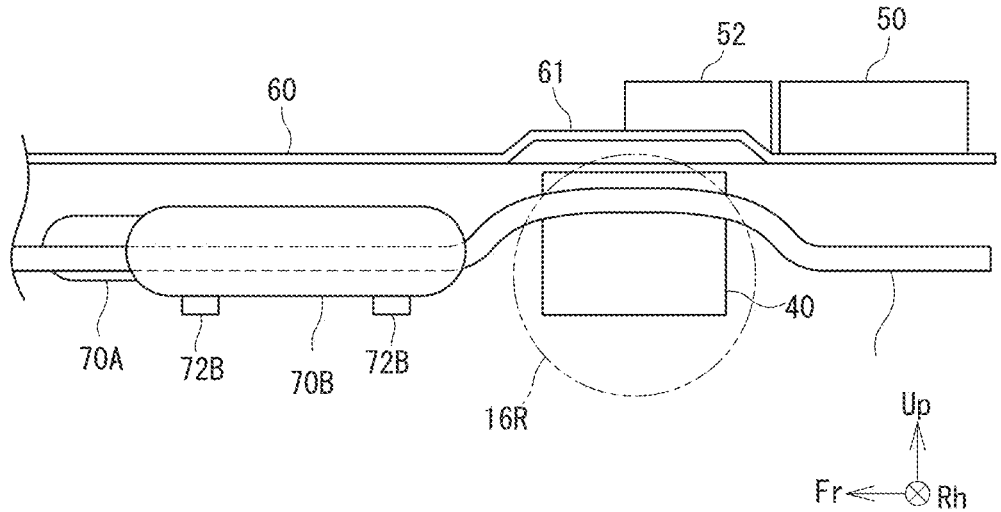
Figure 3:
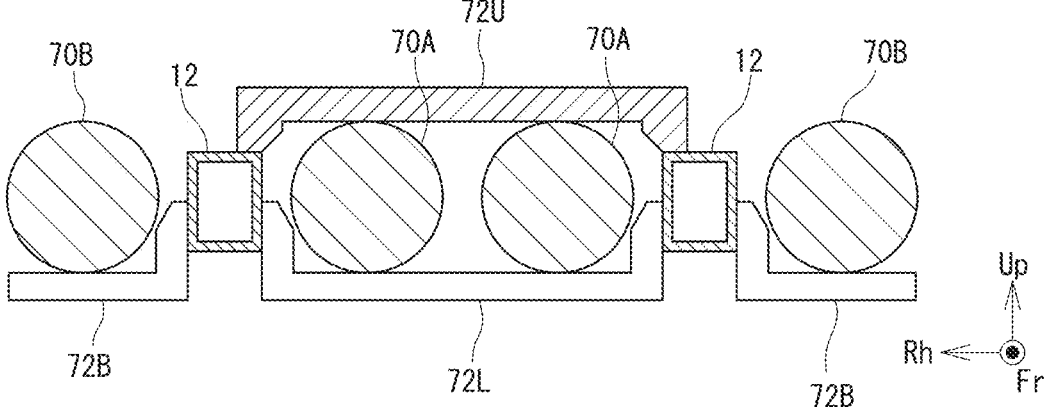
Figure 4:
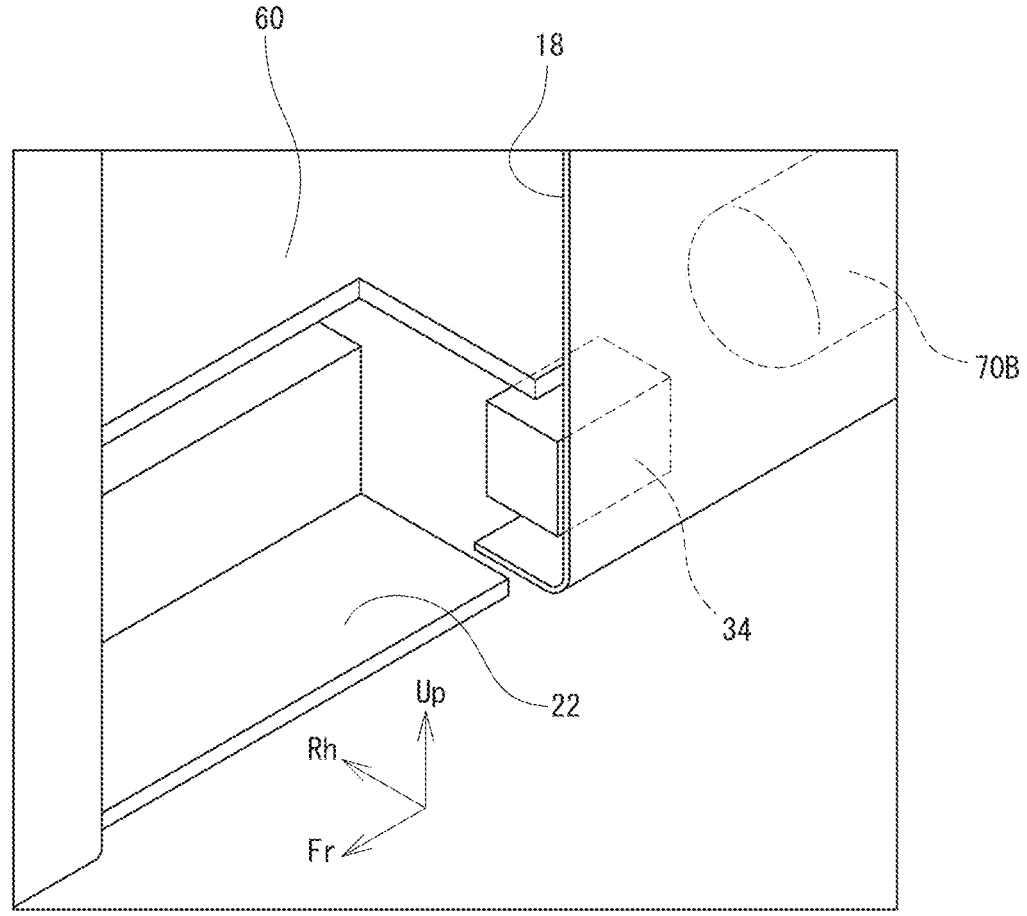

FIG. 1 is a diagram showing a layout of components under a floor of a vehicle;

FIG. 2 is a schematic side view of a rear portion of the vehicle;

FIG. 3 is a cross-sectional view taken along the line A-A of FIG. 1;

FIG. 4 is a schematic view around an entrance step; and

Figure 5:
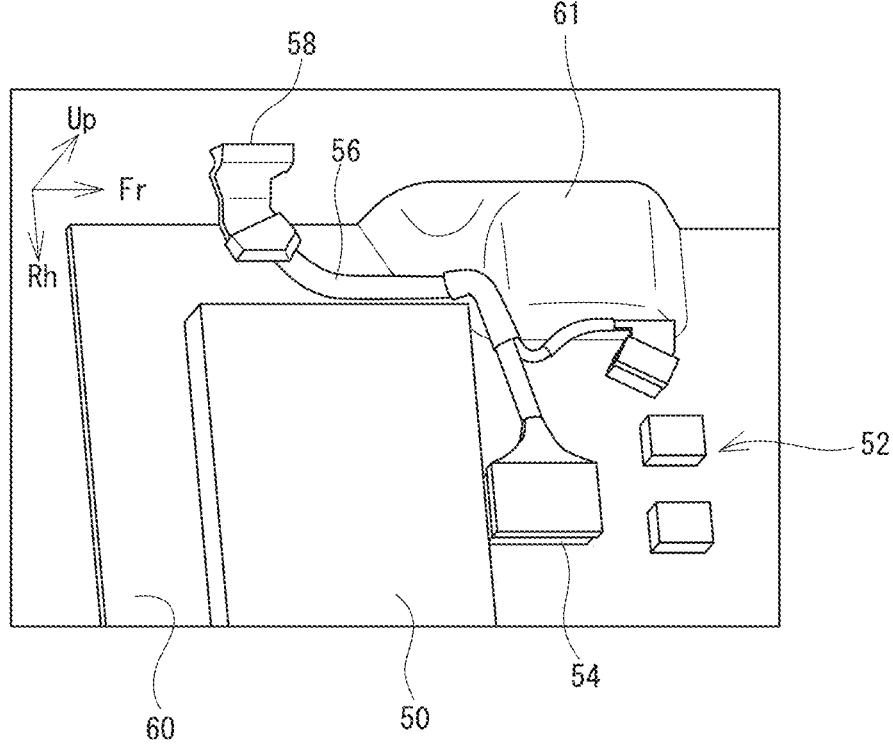

FIG. 5 is a perspective view of the vicinity of a power supply unit as viewed from above.

DESCRIPTION OF EMBODIMENT

Hereinafter, a configuration of a fuel cell electric vehicle 10 (hereinafter referred to as a "vehicle 10") will be described with reference to the drawings. FIG. 1 is a diagram showing a layout of components under a floor of a vehicle 10. FIG. 2 is a schematic side view of a rear portion of the vehicle 10, and FIG. 3 is a cross-sectional view taken along the line A-A of FIG. 1. In FIG. 1, a double-dashed line indicates components arranged above the floor panel 60 (not shown in FIG. 1) of the vehicle 10. In the following drawings, "Up", "Fr" and "Rh" indicate the upper side, the front side and the right side of the vehicle 10, respectively.

The vehicle 10 shown in FIG. 1 drives the rotary electric machine 42 by the electric power output from the fuel cell to drive the vehicle 10. Hereinafter, the vehicle 10 used as a bus will be described as an example. However, the vehicle 10 is not limited to the bus, and may be another type of vehicle, for example, a truck, a ban, a passenger car, or the like.

The vehicle 10 has a ladder frame structure. The ladder frame structure is a vehicle body structure having a frame member formed in a ladder shape. More specifically, the vehicle 10 includes a pair of side rails 12 and a plurality of cross members 14a to 14f. Hereinafter, when a plurality of cross members 14a to 14f are not distinguished, they are referred to as "cross members 14". In FIG. 1, the ladder frame is grey-hatched.

The side rail 12 is a skeleton member extending in the longitudinal direction of the vehicle. The pair of side rails 12 are disposed under the floor of the vehicle 10 at intervals in the vehicle width direction. The cross member 14 is a skeleton member extending in the vehicle width direction and connecting the pair of side rails 12. The cross member 14 is positioned at the same height as the side rail 12. Accordingly, the vehicle width direction end surface of the cross member 14 is connected to the vehicle width direction inner side surface of the side rail 12. The plurality of cross members 14a to 14f are arranged at intervals in the longitudinal direction of the vehicle.

A floor panel 60 is disposed above the ladder frame. The floor panel 60 functions as a floor of the cabin. The upper space of the floor panel 60 serves as a cabin. Under the floor panel 60, wheels 16F and 16R, an FC unit 24, a PCU 26, an auxiliary battery 34, a drive unit 40, and a hydrogen tank 70 are arranged.

The FC unit 24 is disposed between the pair of side rails 12 and at a front portion of the vehicle 10. The FC unit 24 is a unitized device of a fuel cell and its related components. A fuel cell is a type of generator that generates power by chemical reaction between hydrogen and oxygen. The associated components include, for example, a cooling mechanism for cooling the fuel cell and a controller for controlling the chemical reaction of the fuel cell.

Four hydrogen tanks 70A and 70B are arranged in a substantially central portion of the vehicle 10 in the front-rear direction (that is, a portion between the front wheel 16F and the rear wheel 16R). Hereinafter, when two kinds of hydrogen tanks 70A and 70B are not distinguished from each other, they are simply referred to as a "hydrogen tank 70". The hydrogen tank 70 is a container for storing hydrogen. Each of the hydrogen tanks 70 has a substantially cylindrical shape elongated in the front-rear direction. The four hydrogen tanks 70 are roughly divided into two inner hydrogen tanks 70A and two outer hydrogen tanks 70B. In FIG. 2, the outer hydrogen tank 70B has a larger diameter than the inner hydrogen tank 70A.

The two inner hydrogen tanks 70A are arranged in parallel in the vehicle width direction between the pair of side rails 12. The two inner hydrogen tanks 70A are disposed between the third cross member 14c and the fourth cross member 14d.

The two outer hydrogen tanks 70B are both disposed outside the side rail 12 in the vehicle width direction. In other words, the two outer hydrogen tanks 70B are disposed so as to sandwich the pair of side rails 12 and the two inner hydrogen tanks 70A in the vehicle width direction. The two outer hydrogen tanks 70B are disposed closer to the vehicle rear side than the two inner hydrogen tanks 70A so as to be adjacent to the front side of the rear wheel 16R.

Brackets 72U, 72L and 72B (not shown in FIG. 2) for supporting the hydrogen tank 70 are attached to the side rail 12. As shown in FIG. 3, the upper bracket 72U is disposed above the inner hydrogen tank 70A. Both ends of the upper bracket 72U in the vehicle width direction are connected to a pair of side rails 12. The lower bracket 72L is disposed below the inner hydrogen tank 70A. Both ends of the lower bracket 72L in the vehicle width direction are connected to a pair of side rails 12. The inner hydrogen tank 70A is vertically sandwiched and fixed by the lower bracket 72L and the upper bracket 72U.

As shown in FIG. 3, the outer bracket 72B extends outward in the vehicle width direction from the side rail 12. The outer hydrogen tank 70B is mounted on the outer bracket 72B and fixed to the outer bracket 72B by a binding member (not shown) such as a band.

As shown in FIG. 1, the drive unit 40 is disposed rearward of the inner hydrogen tank 70A. More specifically, the drive unit 40 is disposed between the pair of rear wheels 16R. The drive unit 40 outputs driving power to the rear wheel 16R. The drive unit 40 includes a rotary electric machine 42 and a transaxle 44. The rotary electric machine 42 functions as an electric motor which is driven by electric power supplied from a main battery 50, which will be described later, and outputs power. The rotary electric machine 42 also functions as a generator that converts braking torque of the vehicle 10 into electric power. The electric power generated by the rotary electric machine 42 is stored in the main battery 50. The transaxle 44 is a transmission mechanism that transmits power output from the rotary electric machine 42 to the rear wheel 16R. The transaxle 44 includes, for example, a transmission and a differential gear.

Various electronic components are also disposed between the FC unit 24 and the inner hydrogen tank 70A. For example, an electric heater 28, a junction box 30, and an air conditioning unit 32 are disposed between the FC unit 24 and the inner hydrogen tank 70A. The PCU 26 includes an inverter, and controls the rotation and torque of the rotary electric machine 42.

An entrance opening 18 through which an occupant gets on and off is formed in a left side surface of the vehicle 10. The entrance opening 18 is positioned on the vehicle rear side with respect to the front wheel 16F and on the vehicle front side with respect to the outer hydrogen tank 70B. The entrance opening 18 is opened and closed by an entrance door 20. Further, an entrance step 22 is disposed inside the entrance door 20 in the vehicle width direction.

FIG. 4 is a perspective view around the entrance step 22. As shown in FIG. 4, the entrance step 22 is a stepped member connected to the floor panel 60. The lowest stage of the entrance step 22 is located below the floor panel 60. An auxiliary battery 34 is disposed between the entrance step 22 and the left outer hydrogen tank 70B. The auxiliary battery 34 supplies electric power to an auxiliary device (for example, the air conditioning unit 32 or the like) mounted on the vehicle 10.

As shown in FIGS. 1 and 2, a main battery 50 is disposed at a rear portion of the vehicle 10 and above the floor panel 60. The main battery 50 is a battery that stores electric power generated by the fuel cell. The main battery 50 supplies electric power necessary for traveling the vehicle 10 to the rotary electric machine 42, and stores electric power generated by the rotary electric machine 42. The electric power of the main battery 50 is also supplied to an external device via an external power supply unit 52 described later.

For example, the electrical capacity of the main battery 50 is large to some extent so that electric power for evacuation life can be supplied to the disaster at the time of disaster. In this case, the size of the main battery 50 is also increased to some extent. For example, as shown in FIG. 1, the dimension of the main battery 50 in the vehicle width direction is larger than the distance between the pair of side rails 12.

The external power supply unit 52 is disposed adjacent to the front side of the main battery 50. In other words, the external power supply unit 52 is disposed above the drive unit 40 and between the pair of rear wheels 16R. FIG. 5 is a perspective view of the periphery of the external power supply unit 52. The external power supply unit 52 converts electric power of the main battery 50 into electric power available in a general electric appliance and outputs the converted electric power. The external power supply unit 52 includes, for example, an inverter 54 for external electric power supply. Here, as shown in FIG. 5, a raised portion 61 is formed at an end portion of the floor panel 60 in the vehicle width direction. The raised portion 61 is a portion where the floor panel 60 is partially raised in order to avoid interference with the rear wheel 16R. The external power supply unit 52 is disposed adjacent to the raised portion 61.

An exhaust pipe 56 is attached to the external power supply unit 52. The exhaust pipe 56 is a pipe through which cooling air, i.e., exhaust air, flows after cooling the external power supply unit 52. As shown in FIG. 5, the exhaust pipe 56 extends from an electronic component (e.g., inverter 54) of the external power supply unit 52 toward an end portion in the vehicle width direction. An exhaust port 58 for exhausting exhaust gas is formed at the end of the exhaust pipe 56. The exhaust port 58 faces outward in the vehicle width direction.

Next, the reason why the layout as described above is adopted will be described. In the case of the vehicle 10 disclosed herein, all of the hydrogen tanks 70 are disposed under the floor of the vehicle 10. As a result, a wider cabin can be ensured than when the hydrogen tank 70 is disposed in the cabin. Further, with such a configuration, even when hydrogen leaks from the hydrogen tank 70 to the floor, the hydrogen hardly flows into the cabin.

The inner hydrogen tank 70A is disposed between the pair of side rails 12. With this configuration, a larger amount of hydrogen can be stored as compared with the vehicle described in Patent Document 1. That is, in the case of the vehicle described in Patent Document 1, the hydrogen tank

70 is disposed only outside the side rail 12 in the vehicle width direction. However, since the wheels 16F and 16R are disposed outside the side rail 12 in the vehicle width direction, a space in which the hydrogen tank 70 can be disposed is limited in the case of the vehicle described in Patent Document 1. On the other hand, in the case of the vehicle 10 disclosed in the present specification, the space between the pair of side rails 12 is also used as the arrangement space of the hydrogen tank 70. This makes it possible to store a larger amount of hydrogen.

Here, the inner hydrogen tank 70A is disposed between the third cross member 14c and the fourth cross member 14d. In other words, the inner hydrogen tank 70A does not straddle the cross members 14c and 14d. Therefore, the inner hydrogen tank 70A can be disposed at substantially the same height as the cross member 14 and the side rail 12. In this case, the upper end height of the inner hydrogen tank 70A is kept lower than in the case where the inner hydrogen tank 70A straddles the cross members 14c and 14d. As a result, the ground contact height of the floor panel 60 is kept low, and a wide vehicle compartment can be ensured.

Naturally, the cross members 14c and 14d do not exist outside the side rail 12 in the vehicle width direction. Therefore, the outer hydrogen tank 70B is disposed independently of the positions of the cross members 14c and 14d. Specifically, the outer hydrogen tank 70B is disposed adjacent to the vehicle front side of the rear wheel 16R. With such a configuration, it is possible to secure a space in which various components can be disposed on the front side of the vehicle with respect to the outer hydrogen tank 70B. For example, by disposing the left outer hydrogen tank 70B adjacent to the rear wheel 16R, a space for disposing the auxiliary battery 34 can be ensured between the outer hydrogen tank 70B and the entrance step 22. In this case, the operator can easily access the auxiliary battery 34 located below the floor panel 60 from the side of the entrance step 22. Since a relatively large space can be ensured between the right outer hydrogen tank 70B and the right front wheel 16F, various components can be disposed.

Further, in this example, the outer hydrogen tank 70B is disposed so as to be displaced from the inner hydrogen tank 70A in the vehicle longitudinal direction. With this arrangement, the brackets 72U, 72L, and 72B supporting them can also be displaced in the longitudinal direction of the vehicle. That is, as shown in FIG. 1, a lower bracket 72L, an upper bracket 72U, an outer bracket 72B, a lower bracket 72L, and an outer bracket 72B are arranged in this order from the front of the vehicle so as to be spaced from each other in the front-rear direction of the vehicle. Since the plurality of brackets 72L, 72U, and 72B are displaced in the longitudinal direction of the vehicle, the operation of assembling the brackets 72L, 72U, and 72B to the side rail 12 can be facilitated, and the load on the side rail 12 can be distributed.

As is apparent from the above description, in the case of the vehicle 10 disclosed in the present specification, the FC unit 24 is disposed in the front portion of the vehicle 10, the hydrogen tank 70 is disposed in the center of the vehicle 10, and the drive unit 40 and the main battery 50 are disposed in the rear portion of the vehicle 10. This arrangement stabilizes the weight balance of the vehicle 10 as a whole.

The drive unit 40 is disposed between the pair of rear wheels 16R, i.e., the pair of drive wheels. With such a configuration, since the propeller shaft becomes unnecessary, the space efficiency under the floor of the vehicle 10 is improved.

Here, as described above, the electric power of the main battery 50 can be supplied to an external device (for example, a general electric appliance) via the external power supply unit 52. In order to stably perform such external power supply, the electric power capacity of the main battery 50 is large to some extent. Therefore, the size of the main battery 50 becomes large, and the dimension of the main battery 50 in the vehicle width direction is larger than the distance between the pair of side rails 12. In this case, it is difficult to arrange the main battery 50 under the floor. Therefore, in the case of the vehicle 10 disclosed in the present specification, the main battery 50 is disposed above the floor panel 60 of the vehicle 10.

Further, the occupant electrically connects or disconnects the external power supply unit 52 and the external device as necessary. Therefore, the external power supply unit 52 needs to be disposed in a place where the occupant can easily access the external power supply unit 52. Therefore, the external power supply unit 52 is disposed above the floor panel 60, specifically, on the front side of the main battery 50.

In order to cool the external power supply unit 52, cooling air is introduced into the external power supply unit 52. The cooling air (i.e., exhaust air) passing through the cooling unit is discharged to the outside through the exhaust pipe 56 as described above. An exhaust port 58 provided at the end of the exhaust pipe 56 faces outward in the vehicle width direction. In other words, the exhaust port 58 does not face under the floor of the vehicle 10. Therefore, even when hydrogen leaks from the hydrogen tank 70 to under the floor, the hydrogen hardly flows into the exhaust port 58. As a result, by directing the exhaust port 58 outward in the vehicle width direction, it is possible to effectively prevent hydrogen from flowing into the vehicle compartment.

Further, by employing the layout as described above, the design change amount from the existing vehicle can be suppressed to be small. In this case, the existing vehicle is a front engine/rear drive engine vehicle. That is, in the vehicle 10 disclosed in the present specification, the engine, the propeller shaft, and the differential gear of the existing vehicle are respectively replaced by the FC unit 24, the hydrogen tank 70, and the drive unit 40. Therefore, the existing vehicle can be used as it is as the skeleton structure. In addition, the arrangement of many components can be made the same as that of the existing vehicle. As a result, the design change amount from the existing vehicle can be reduced. Further, since the same components as those of the existing vehicle can be used as they are, the cost of the vehicle 10 can be reduced.

The above description is only an example, and other configurations may be appropriately changed as long as they have the configuration described in claim 1. For example, the number of hydrogen tanks 70 may be appropriately changed. For example, three or more inner hydrogen tanks 70A may be arranged in parallel between the pair of side rails 12. The placement of the FC unit 24 and the drive unit 40 may also be changed as appropriate. The external power supply unit 52 may be omitted.

REFERENCE SIGNS LIST

10 fuel cell electric vehicle, 12 side rail, 14 cross member, 16F front wheel, 16R rear wheel, 18 entrance opening, 20 entrance door, 22 entrance step, 24 FC unit, 26 PCU, 28 electric heater, 30 junction box, 32 air conditioning unit, 34 auxiliary battery, 40 drive unit, 42 rotary electric machine, 44 transaxle, 50 main battery, 52 external power supply unit, 54 inverter, 56 exhaust pipe, 58 exhaust port, 60 floor panel, 61 raised portion, 70A inner hydrogen tank, 70B outer hydrogen tank, 72B outer bracket, 72L lower bracket, 72U upper bracket.

The invention claimed is:

1. A fuel cell electric vehicle comprising:
   a fuel cell;
   a pair of side rails extending in a front-and-rear direction of the vehicle under a floor of the vehicle;
   a plurality of hydrogen tanks disposed under the floor of the vehicle, at a rear side of a front wheel, and at a front side of a rear wheel; and
   a main battery for storing electric power generated by the fuel cell, wherein
   the plurality of hydrogen tanks include two or more hydrogen tanks arranged in parallel in a vehicle width direction between the pair of side rails, and
   the main battery is disposed on the floor of the vehicle at a rear portion of the vehicle.

2. The fuel cell electric vehicle according to claim 1 further comprising:
   an external power supply unit that includes an inverter and supplies the electric power of the main battery to an external device; and
   an exhaust pipe that guides exhaust air, which is cooling air after cooling the external power supply unit, to the outside, wherein
   the external power supply unit is disposed adjacent to a front side of the main battery on the floor of the vehicle,
   the exhaust pipe includes an exhaust port for exhausting an exhaust gas, and
   the exhaust port faces outward in the vehicle width direction above the floor of the vehicle.

3. The fuel cell electric vehicle according to claim 1 further comprising:
   a drive unit that includes a rotary electric machine and rotationally drives wheels, wherein
   the plurality of hydrogen tanks include two inner hydrogen tanks and two outer hydrogen tanks,
   the two inner hydrogen tanks are arranged in parallel in the vehicle width direction between the pair of side rails,
   the two outer hydrogen tanks are disposed so as to sandwich the pair of side rails and the two inner hydrogen tanks in the vehicle width direction,
   the drive unit is disposed between the pair of side rails and rearward of the two inner hydrogen tanks, and
   the two outer hydrogen tanks are arranged offset rearward of the vehicle relative to the two inner hydrogen tanks.

4. The fuel cell electric vehicle according to claim 3 further comprising:
   an entrance opening formed in a side surface of the vehicle;
   an entrance step disposed adjacent to an inner side of the entrance opening in a vehicle width direction below a floor surface; and
   an auxiliary battery, wherein
   the rear wheel is a drive wheel,
   the drive unit is disposed between left and right rear wheels,
   each of the two outer hydrogen tanks is disposed adjacent to a front side of the rear wheel,
   the auxiliary battery is disposed adjacent to a front side of one of the two outer hydrogen tanks,
   the entrance step is disposed adjacent a front side of the auxiliary battery.

5. The fuel cell electric vehicle according to claim 4, wherein the fuel cell is disposed closer to a front of the vehicle than the plurality of hydrogen tanks.

* * * * *